United States Patent
Moody

[19]

[11] Patent Number: 5,992,584
[45] Date of Patent: *Nov. 30, 1999

[54] DASHPOT FOR POWER CYLINDER

[75] Inventor: Paul E. Moody, Barrington, R.I.

[73] Assignee: The United States of America as represented by the Secretary of the Navy, Washington, D.C.

[ * ] Notice: Under 35 U.S.C. 154(b), the term of this patent shall be extended for 47 days.

[21] Appl. No.: 08/624,734

[22] Filed: Mar. 26, 1996

[51] Int. Cl.⁶ .......................................................... F16F 9/24
[52] U.S. Cl. ........................... 188/297; 188/322.15; 92/37
[58] Field of Search ...................... 188/297, 298, 188/316, 322.15, 322.18, 269; 267/64.23, 64.27, 124; 92/37, 38, 39

[56] References Cited

U.S. PATENT DOCUMENTS

| | | | |
|---|---|---|---|
| 1,684,743 | 9/1928 | Reilly | 92/37 |
| 1,740,924 | 12/1929 | Kellogg | 92/37 X |
| 2,613,610 | 10/1952 | Saalfrank | 92/37 X |
| 3,002,500 | 10/1961 | Diesing et al. | 92/37 |
| 3,013,816 | 12/1961 | Isham | 188/298 |
| 3,967,707 | 7/1976 | Carlton | 188/298 |
| 4,342,884 | 8/1982 | Ban et al. | 188/298 X |
| 4,815,574 | 3/1989 | Taylor et al. | 188/322.15 X |

Primary Examiner—Robert J. Oberleitner
Assistant Examiner—Pamela J. Lipka
Attorney, Agent, or Firm—Michael J. McGowan; James M. Kasischke; Prithvi C. Lall

[57] ABSTRACT

This invention relates to a pneumatic power cylinder dashpot piston which is formed of an elastomeric cylinder and a sleeve and having a space between the interior wall of the cylinder and the exterior wall of the sleeve, and the space is filled with a fluid. The piston is connected to a power shaft of a power cylinder. The sleeve is corrugated and is formed integrally with the cylinder so as to prevent the escape of the fluid through a joint. The interior cylinder wall is tapered from the center thereof in opposite directions so that the cylinder, engaged by a disk on the power shaft, gradually comes into contact with an end portion of the cylinder whereby the corrugations of the sleeve are compressed at one end and the other corrugations are straightened.

15 Claims, 2 Drawing Sheets

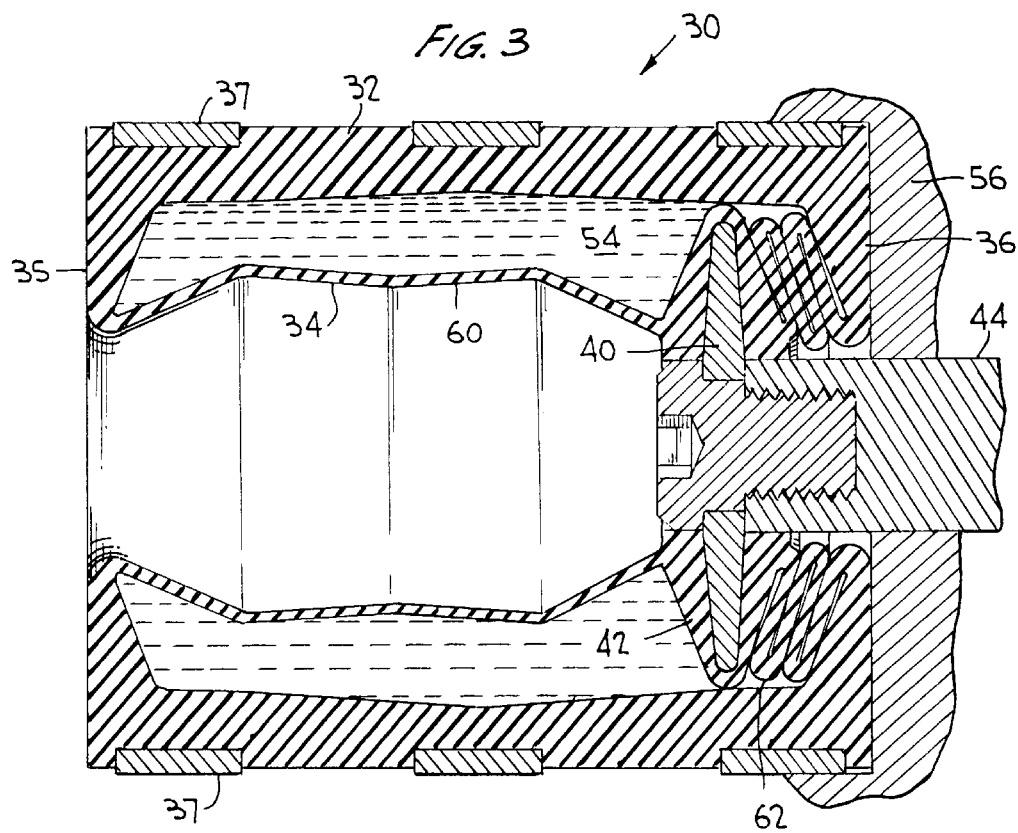
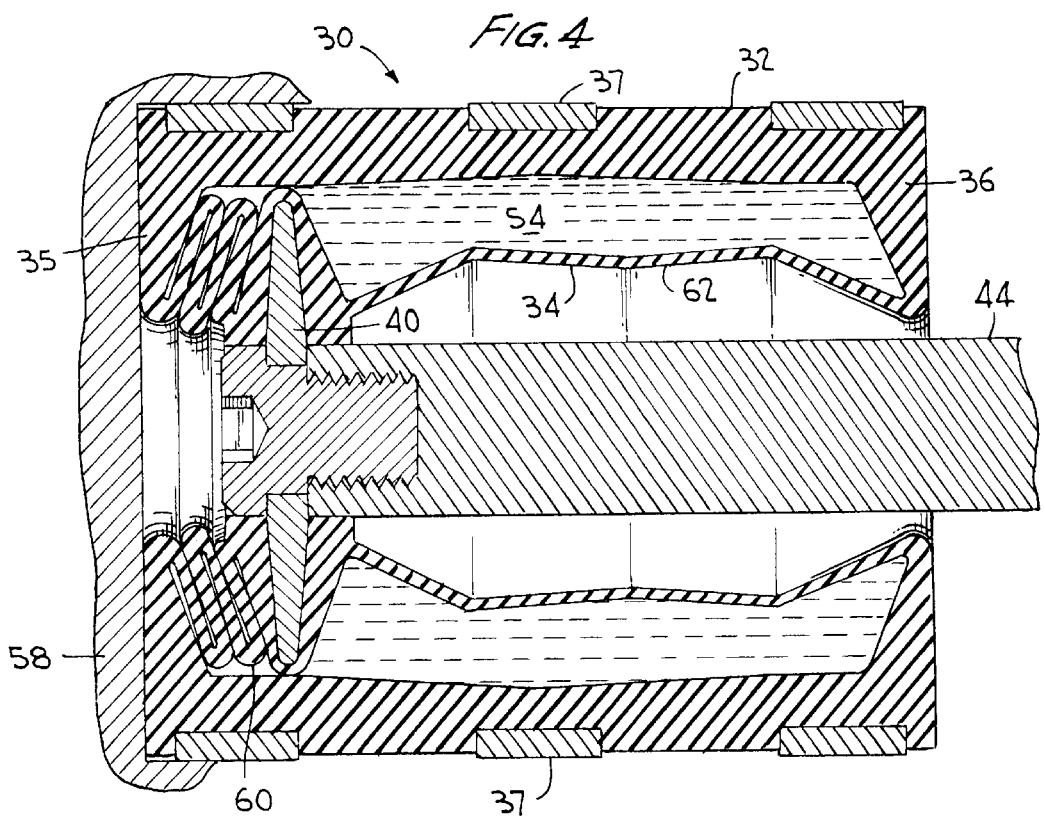

DASHPOT FOR POWER CYLINDER

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

This invention relates to an improved dashpot system and more particularly to a dashpot for a power cylinder.

(2) Description of the Prior Art

Existing power cylinders have dashpots at the end of their power strokes. A dashpot is a device used to cushion or dampen a movement in a power cylinder and consists essentially of a power cylinder containing a gas or a liquid fluid and a piston moving in the assembly. The end of the power cylinder is configured to contain a centered cup with a tapered inside diameter and the piston is configured to include a centrally oriented cone extending from each side of the piston. The end of the power stroke will be such that the cone will enter the cup and displace the fluid contained therein. However, as the cone penetrates the tapered cup, the radial clearance between the cup and the cone will narrow. As a result, due to the decreased clearance, an increasingly greater resistance to fluid flow develops. This results in a higher pressure being developed in the cup which eventually stops the piston. The pressure results in a higher and higher force being developed and acting on the cone and, thus, on the piston, to decelerate the piston from the direction in which it is moving. In the perfect system, the decelerating counter action of the cup and cone on the piston is of such a force so as to stop the piston. The momentum of the system has, therefore, been counterbalanced and the piston stops without any end position shock.

This arrangement works fine when it is operated with a relatively incompressible fluid, such as an oil. However, when the fluid is a gas, such as air, it will not work because the air compresses. One reason for this is that if the supply for an incompressible fluid is shut off, pressure in the power cylinder drops very rapidly. However, if the supply is shut off for a compressible fluid, then the gas which is already in the power cylinder will simply expand and continue to exert force on the system's piston. In addition, it is necessary to closely control the clearance between the cup and cone in a pneumatic dashpot or insufficient pressure will be built up in the cup to properly decelerate the piston. These close tolerances introduce the risk of the cup and cone having a mechanical impact upon the system reaching the end of the stroke. Further, even if the mechanical components are aligned and are machined perfectly, the trapped air is compressible and therefore does not develop a significant counter-balancing force until a significant portion of dashpot travel has occurred. As a result of the air's compressibility, it is necessary to make pneumatic dashpots lengthy. The combination of the requirements for precise machining, rigid alignment, and a lengthy dashpot results in expensive dashpots which are very susceptible to malfunction due to wear, dirt particles in a system or the like.

Past consideration has been given to combining the benefits of a hydraulic dashpot in a pneumatic power cylinder. However, designing a hydraulic dashpot and incorporating it into caps of a pneumatic power cylinder would be accomplished at considerable risk as such operation would be dependent upon proper alignment of a seal located between the dashpot actuating rod which would be necessary in order to separate the pneumatics from the hydraulics. While leakage of oil into the pneumatic system could cause autoignition, leakage of air into the oil dashpot would destroy the effectiveness of the dashpot. Another alternative is to design a slave hydraulic cylinder which can be connected in parallel to a working pneumatic cylinder. This may eliminate the chance of the hydraulics and pneumatics mixing, but would be accomplished at considerable cost and space.

A search has been conducted of the United States Patent Office records and certain patents have been cited as further illustrative of the art. These patents are: Ban et al., entitled "Piston Unit", U.S. Pat. No. 4,342,884; Hasche et al., entitled "Valve Control Mechanism", U.S. Pat. No. 2,737,970; Williams, entitled "Rod Operated Valve", U.S. Pat. No. 4,359,204; Whittaker et al., entitled "Valve Assembly", U.S. Pat. No. 3,286,465; and Fornasari, entitled "Four-Way Electrovalve Governed By A Thermoactuator Associated With A Thermistor (PTC)", U.S. Pat. No. 4,753,271.

SUMMARY OF THE INVENTION

A primary object of the invention is to provide a simplified dashpot for a pneumatic power cylinder.

Another primary object of the invention is to provide a dashpot as part of the piston of a power cylinder.

Another object of the invention is to provide a dashpot which may be used in any type of power cylinder, liquid or gas. By utilizing an independent dashpot, leakage of oil into the pneumatic cylinder is eliminated.

A further object of the invention is to provide a dashpot for a power cylinder which is simple in construction, low in cost and safe in operation.

The power cylinder piston of the invention includes a cylinder, a sleeve within the cylinder and secured to the cylinder, the sleeve being corrugated and having a portion thereof provided with a disk member which connects it to a power shaft, the power shaft extends out of one end of the cylinder for connection to the mechanism being operated, and the sleeve and cylinder being formed of an elastomeric material and of a length to permit the corrugations at one side of the piston be straightened out while the corrugations at the other side of the piston are compressed.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 3 is an enlarged sectional view of the piston of the pneumatic power cylinder of FIG. 1 when it is housed against the right end of the power cylinder and illustrates the construction of the dashpot with the sleeve having the corrugations thereof substantially removed in part and compressed in part; and FIG. 4 is a sectional view similar to FIG. 3 illustrating the piston when it is housed against the left end of the power cylinder.

DESCRIPTION OF THE PREFERRED EMBODIMENT

Figure 1:
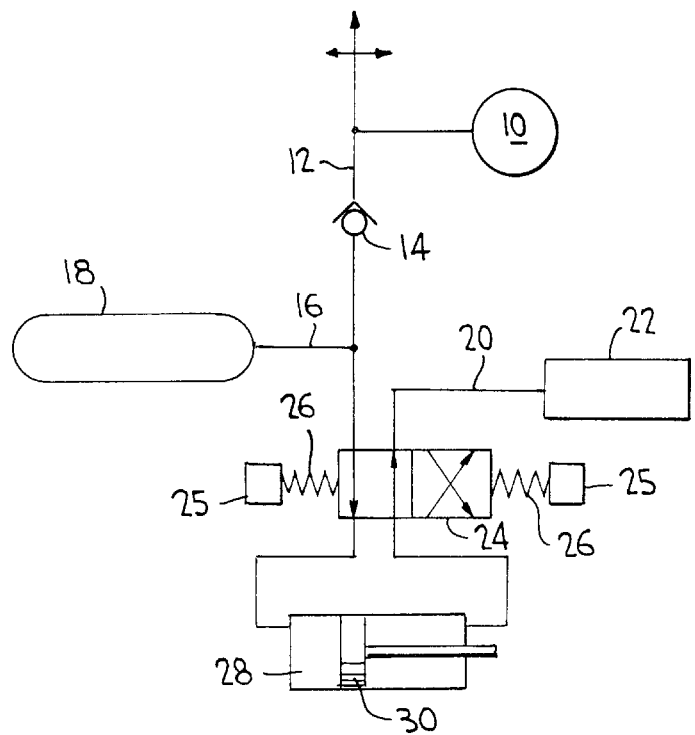
FIG. 1 is a diagram of a pneumatic control system for a pneumatic power cylinder utilizing the dashpot system of the invention.

Referring now to the drawings in detail, reference is made first to FIG. 1. It will be seen that there is provided air compressor 10 which is connected to a plurality of air feed lines 12. Each feed line 12 has therein a check valve 14. Coupled to the line 12 is an air supply line 16 which is connected to an air flask 18. Compressed air is stored within the air flask 18. There is also a discharge line 20 leading to a muffler 22. Adjacent the muffler 22 there is a two position control valve 24 which is illustrated as being controlled by a pair of solenoids 25 and held in place by springs 26. The control valve 24 is a remote control valve and controls the movement of a power cylinder 28 having an air piston 30 therein. In the position drawn, the valve 24 directs high pressure air from feed line 12 to the left side of the air piston 30 of the power cylinder 28 while the air on the right side of the air piston is vented by control valve 24 to the muffler 22. In this position, the air piston 30 is moved to the right of the power cylinder and remains there held by the high pressure air on the left side of the piston. Similarly, in the other position of the control valve 24, it delivers air to the right side of the power cylinder 28 and moves air piston 30 to the left side of the power cylinder 28.

Figure 2:
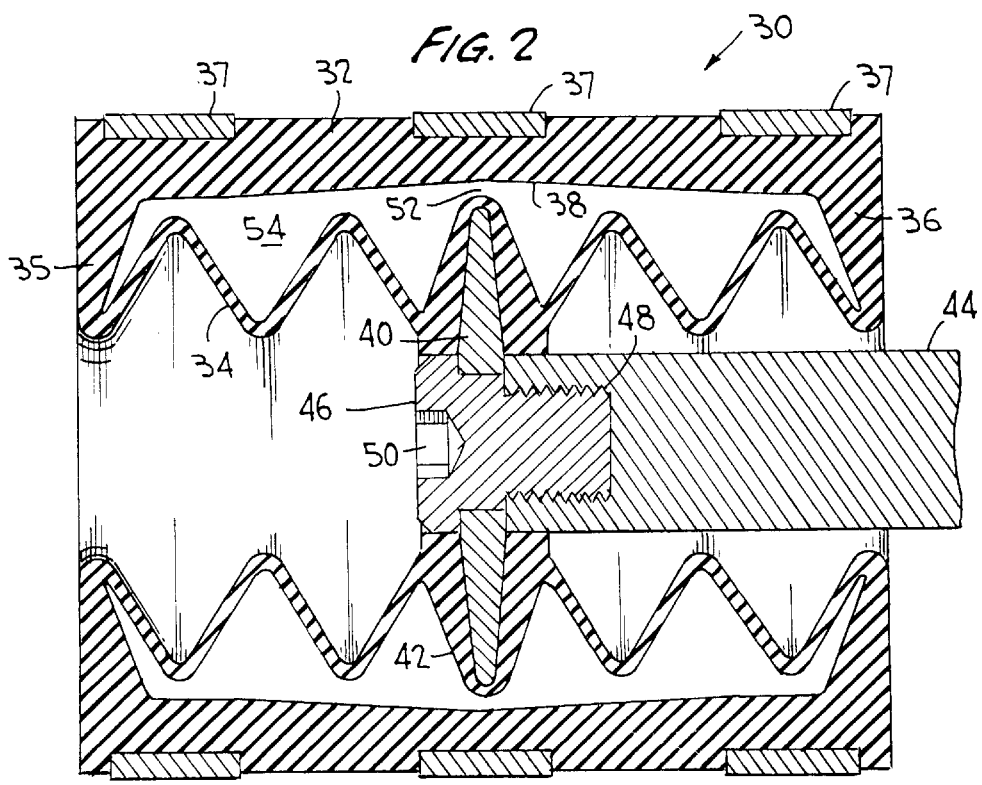
FIG. 2 is an enlarged sectional view of the piston of the pneumatic power cylinder of FIG. 1 in mid stroke and illustrating the construction of the dashpot of the invention.

As is best shown in FIGS. 2, 3 and 4, the dashpot of air piston 30 is formed of an elastomeric material and includes a cylinder 32 and a corrugated sleeve 34 and end pieces 35 and 36. The cylinder 32, sleeve 34, and end pieces 35 and 36 are integral and are manufactured as a single unit. It will further be seen that the cylinder 32 is reinforced by three sealing bands 37, although any other type of sealing construction may be utilized. These sealing bands 37 prevent high pressure air from leaking around the periphery of piston 30 within power cylinder 28.

The cylinder 32 has an interior wall 38 which is of a tapered construction and has a smaller diameter at the cylinder ends 35 and 36. In the center of the sleeve 34, there is tightly engaged a tapered disk 40 which is engaged in the center of a corrugated part 42. The cylinder 32 is secured to one end of a power shaft 44 by means of the disk 40 and a retaining bolt 46 which is threaded into the power shaft 44 and is secured to the power shaft 44 at recess 48 thereof. When the bolt 46 is threaded into the power shaft, it is provided with means to turn bolt 46 as at 50. The disk 40 can, for example, be segmented for installation inside the cylinder 32 or one end of the cylinder 32 can be mechanically expanded in order to slip the disk 40 into cylinder 32.

It should also be noted that in the center of the interior of cylinder 32, there is a gap 52 between the interior wall 38 of cylinder 32 and the exterior wall of the sleeve 34 and corrugated part 42 as shown in FIG. 2. As previously noted, the interior wall 38 of the cylinder 32 decreases in diameter as when moving from the center of the piston toward an end of the piston. In this instance, there will be no gap when the power shaft 44 and disk 40 are moved to the right or the left as shown in FIGS. 3 and 4.

The space between the interior wall 38 of cylinder 32 and the exterior wall of sleeve 34 is filled with a non-combustible fluid such as braking oil 54. This is accomplished by removal of a piston plug (not shown) and filling the space with the oil, and then returning the plug such that it will ensure complete filling of the space and sealing the plug so that there can be no leakage.

Referring now to FIG. 3, as the air piston 30 travels to the end cap 56 on the right side of the power cylinder 28, the piston 30 and the end caps 35 and 36 thereof come to a stop. The corrugated sleeve 34 continues in motion due to the momentum of the mechanism being driven by power shaft 44. The dashpot of piston 30 cushions and dampens the momentum of the piston 30 in the power cylinder 28 generally by two means. First, the momentum force of the piston is absorbed by the force necessary to stretch or straighten one corrugated portion 60 of sleeve 34 and by the force necessary to collapse the other corrugated portion 62 of sleeve 34 and which is to the right of the disk 40. Secondly, the corrugated part 42 of sleeve 34 moves in conjunction with disk 40 to the right of the cylinder 32 as the piston 30 stops and the power shaft 44 and disk 40 continue to move. This will force the oil 54 which was located to the right of disk 40 to squirt through the gap 52 between the interior wall 38 of cylinder 32 and the exterior wall of sleeve 34. However, as the gap 52 becomes smaller and smaller due to the taper of the interior wall 38 and the decreasing diameter between interior wall 38 and exterior wall of sleeve 34, there results a higher and higher back pressure being built up in the oil 54 which is located to the right of disk 40 while it is being transmitted to the area to the left of disk 40. This ever increasing pressure results in an ever increasing force which slows the motion of disk 40, shaft 44, and the mechanism attached to it.

Referring now to FIG. 4, as the air piston 30 travels to the end cap 58 on the left side of the power cylinder 28, the piston 30 and the end caps 35 and 36 thereof come to a stop. The corrugated sleeve 34 continues in motion due to the momentum of the mechanism being driven by power shaft 44. The dashpot of piston 30 cushions and dampens the momentum of the piston 30 in the power cylinder 28 as previously described in reference to FIG. 3. In this instance, the corrugated portion 62 of sleeve 34 is straightened out and the other corrugated portion 60 is compressed. Similarly, the oil 54 which was located to the left of disk 40 squirts through the gap 52 between the interior wall 38 of cylinder 32 and the exterior wall of sleeve 34 to the right of disk 40.

As apparent from the above, the dashpot invention described can be utilized in any type of power cylinder, liquid or gas. It will be relatively low in cost, and will be safe in operation since there are no seals to leak between air and liquid chambers of the power cylinder. Further, the dashpot provides flexibility in dashpot fluid selection in that the dashpot fluid can be tailored to operate a fluid dashpot without concern for its influence on other system operating requirements. In the unlikely event of a dashpot fluid leak, the system will still retain its elastomeric damping qualities. In addition, there is no metal to metal contact at the end of a power cylinder's stroke.

Various design configurations can be used with the invention without impacting its uniqueness or detracting from its features. For example, the piston 30 may be lengthened to obtain a more gradual deceleration of the system, or the drive disk 40 need not be centrally located in the cylinder 32 if the assembly has a greater velocity in one direction than another, e.g., if the piston assembly performs its work in one direction and simply returns to an at-battery position by the use of low pressure air.

In light of the above, it is therefore understood that within the scope of the following claims, the invention may be practiced otherwise than as specifically described.

What is claimed is:

1. A power cylinder piston for connection to a power shaft within a power cylinder housing comprising:
   a cylinder having two ends, said cylinder being disposed slidably within said power cylinder housing;

a sleeve within said cylinder and secured to said cylinder ends and defining a space between an interior wall of said cylinder and an exterior wall of said sleeve, said sleeve being annularly corrugated and having a power shaft connection member which connects said sleeve to the power shaft, and said sleeve being formed of an elastomeric material and of a length to permit the corrugations at one side of said member to straighten out while the corrugations at the other side of said member are compressed; and a fluid sealed within said space.

2. The power cylinder piston of claim 1 wherein said cylinder has an inner surface which is tapered inwardly from the longitudinal center of said cylinder to the ends of said cylinder whereby said power shaft connection member of said sleeve is further from said cylinder inner surface at said longitudinal center of said cylinder than when said power shaft connection member is positioned at either of said cylinder ends.

3. The power cylinder piston of claim 1 wherein said fluid is a braking oil.

4. The power cylinder piston of claim 1 wherein said cylinder has at least one sealing band disposed circumferentially about said cylinder.

5. A power cylinder piston for connection to a power shaft comprising:

a cylinder having two ends;

a sleeve within said cylinder and secured to said cylinder ends and defining a space between an interior wall of said cylinder and an exterior wall of said sleeve, said sleeve being annularly corrugated and having a power shaft connection member which connects said sleeve to the power shaft, and said sleeve being formed of an elastomeric material and of a length to permit the corrugations at one side of said member to straighten out while the corrugations at the other side of said member are compressed, said cylinder and said sleeve being integrally formed of the same material and free of joints; and a fluid sealed within said space.

6. The power cylinder piston of claim 5 wherein said cylinder has an inner surface which is tapered inwardly from the longitudinal center of said cylinder to the ends of said cylinder whereby said power shaft connection member of said sleeve is further from said cylinder inner surface at said longitudinal center of said cylinder than when said power shaft connection member is positioned at either of said cylinder ends.

7. A damped power cylinder system comprising:

a working fluid supply for providing a pressurized working fluid;

a working fluid exhaust;

a power cylinder housing having two ends with a connection on each end for communication of said working fluid;

a piston slidably disposed within said power cylinder housing between said connections, said piston comprising:

a piston cylinder having two ends;

a sleeve disposed within said piston cylinder and secured to said piston cylinder ends thereby defining a space between an interior wall of said piston cylinder and an exterior wall of said sleeve, said sleeve being annularly corrugated and having a disk shaped power shaft connection member in an intermediate portion of said sleeve, said sleeve being movable from a first position wherein said power shaft connection member is disposed at one end of said piston cylinder compressing annular corrugations on one side of said power shaft connection member and extending corrugations on the other side of said power shaft connection member to a second position wherein said power shaft connection power member is disposed at the other end of said piston cylinder; and a power shaft joined to said power shaft connection member and extending longitudinally out of said sleeve and said piston cylinder;

said working fluid acting to move said piston from one end of said power cylinder housing to the other end of said power cylinder housing.

8. The damped power cylinder system of claim 7 wherein said piston cylinder and sleeve are integrally formed of an elastomeric material and are free of joints.

9. The damped power cylinder system of claim 8 wherein said piston further comprises at least one reinforcing ring disposed about said piston cylinder.

10. The damped power cylinder system of claim 9 wherein said piston cylinder has an inner surface which is tapered radially inward from a maximum between said piston cylinder ends to a minimum at said power cylinder ends.

11. The damped power cylinder system of claim 7 wherein said piston cylinder has an inner surface which is tapered radially inward from a maximum between said piston cylinder ends to a minimum at said power cylinder ends.

12. The damped power cylinder system of claim 7 further comprising a piston fluid disposed in said space between said sleeve and said piston cylinder.

13. The damped power cylinder system of claim 12 wherein said piston fluid is brake fluid.

14. The damped power cylinder system of claim 7 wherein said working fluid is air.

15. The damped power cylinder system of claim 7 wherein said working fluid is a hydraulic fluid.

* * * * *